United States Patent [19]

Cederquist

[11] Patent Number: 4,930,847
[45] Date of Patent: Jun. 5, 1990

[54] MULTICOLOR HOLOGRAPHIC ELEMENT AND APPARATUS FOR HEAD-UP DISPLAY APPLICATIONS

[75] Inventor: John N. Cederquist, Ann Arbor, Mich.

[73] Assignee: Environmental Research Institute of Michigan, Ann Arbor, Mich.

[21] Appl. No.: 284,756

[22] Filed: Dec. 12, 1988

Related U.S. Application Data

[63] Continuation of Ser. No. 71,620, Jul. 9, 1987, abandoned, which is a continuation of Ser. No. 661,932, Oct. 17, 1984, abandoned.

[51] Int. Cl.$^5$ .......................... G03H 1/04; G02B 5/32
[52] U.S. Cl. .................................... 350/3.6; 350/174; 350/3.7; 350/3.72
[58] Field of Search .................. 350/320, 3.72, 3.69, 350/3.7, 3.74, 174

[56] References Cited

U.S. PATENT DOCUMENTS

| | | | |
|---|---|---|---|
| 4,447,111 | 5/1984 | Leib | 350/3.7 |
| 4,560,233 | 12/1985 | Banbury | 350/3.7 |
| 4,575,192 | 3/1986 | Duthie et al. | 350/3.69 |

OTHER PUBLICATIONS

Dickson, L. D. et al., "Holography in the IBM 3687 Supermarket Scanner", IBM J. Res. Devel., vol. 26, No. 2, Mar. 1982, pp. 228–234.

"Computer-Originated Aspheric Holographic Optical Elements", *Optical Engineering*, Jan./Feb. 1982, vol. 21, No. 1, p. 133, Fairchild et al.

*Primary Examiner*—Bruce Y. Arnold
*Assistant Examiner*—David R. Parsons
*Attorney, Agent, or Firm*—Krass and Young

[57] ABSTRACT

A method for producing multicolor holographic optical elements useful in presentation of multicolor holographic images in a head-up display (HUD) system. Because of restricted geometries, such HUDs should allow for reconstruction of wavefronts employing all readout beams coming from the same direction, with the reconstructed wavefront being cast in a specified direction. A first method for producing a multicolor HOE satisfying these conditions makes all recording at the same wavelength but with varying record geometries. A second method for producing multicolor HOEs employs the same record geometries but uses varying wavelengths of recording light. This allows the recording to be made under conditions where the diffraction efficiency of the resulting HOEs is controlled, as are the displayed colors. As the consequence of this, the multicolor HOE can be made under conditions which allow the Bragg condition to be satisfied for each of the readout wavelengths allowing a uniformly bright multicolor wavefront to be reconstructed. A third method for producing such HOEs is to further change the recording geometry by redirecting all the recording wavefronts through the same angular interval. This minimizes the crosstalk which occurs between images recorded at different wavelengths. Also disclosed are apparatus for display of each of the HOEs.

4 Claims, 2 Drawing Sheets

4,930,847

MULTICOLOR HOLOGRAPHIC ELEMENT AND APPARATUS FOR HEAD-UP DISPLAY APPLICATIONS

RELATED APPLICATION

This is a continuation of copending application Ser. No. 071,620 filed on July 9, 1987, now abandoned, which is a continuation of U.S. application Ser. No. 661,932, now abandoned.

FIELD OF THE INVENTION

This invention generally relates to a holographic optical element (HOE) and, more particularly, is concerned with a multicolor HOE and with a multicolor holographic head-up display (HUD) using such an HOE.

BACKGROUND OF THE INVENTION

Head-up displays (HUDs) provide pilots with two superimposed images. One image can be a view of the outside world while the other image can be symbology relating to that view of the outside world.

The ability to display concurrent images is provided by an optical element in the HUD called a combiner. The combiner is typically a partially silvered mirror which both transmits the view from the outside world to the pilot and reflects the second image toward the observer from another direction. This second image can also be collimated by the combiner so that it is focused at infinity, obviating the need for the pilot's eyes to refocus when he diverts his attention from one image to the other. Combiners also provide an HUD with optical power.

Using a holographic optical element (HOE) as a HUD combiner makes the second image brighter and larger. However, present HOEs display only a single color; the design of multicolor HOEs is even more complex than the design of single color HOEs. Also, additional equipment and/or greater volume will be required by multicolored HUDs in the already crowded and complex environment of an aircraft cockpit.

HOEs are typically recorded using lasers for the coherent sources of light, while HUDs typically generate their images from a source such as a cathode ray tube (CRT). The phosphors used in multicolor CRTs do not create light in the same wavelengths as those available from the lasers used in the recording process. This mismatch, even if only slight, has a very detrimental effect on the diffraction efficiency of the reconstructed images produced by HOEs.

Several investigators have dealt with difficulties providing bright images, and/or multicolored displays by using HOEs. None, however, has provided a satisfactory concurrent solution to these problems suitable for use in a HUD.

In their paper "Wavefront Reconstruction with Diffused Illumination and 3-Dimensional Objects," Journal of Optical Society of America, Volume 54, No. 11, November 1964, Leith and Upatnieks discussed the possibility of reproducing a wavefront containing a multicolor, 3-dimensional image. The system they describe presumes the illumination of the original object by separate coherent beams, one for each of the three primary colors. Each of the primary colors illuminates the object by means of a separately placed mirror. These record beams then form interference patterns with a coherent beam of the same color to create the hologram for that particular primary color.

To reconstruct this holographic image the resulting hologram must be illuminated by three readout beams, having the proper wavelengths and illuminating the hologram from the proper directions. The wavelengths used in the three readout beams must be identical to the respective wavelengths in the three record beams. The apparatus required is cumbersome and will not comply with the strict volume requirements in most HUD applications.

In their paper, "Multicolor Wavefront Reconstruction," Applied Physics Letters, Volume 7, No. 3, Aug. 1, 1965, Pennington and Lin describe a method for reconstructing multicolor wavefronts where the recording geometry for each of the colors satisfies the Bragg condition. The reconstructed wavefronts are thus very bright. Again, however, the method requires that the hologram be recorded at the same wavelengths as the intended reproduced wavelengths. This will not be the case where holograms are recorded through use of lasers but the images are reproduced by means of CRTs.

U.S. Pat. No. 3,532,406 discloses a method for reconstructing multicolor images from reflection holograms in which both the reference and object beams contain two or more colors and each projects from a different direction onto the photographic plate. This method suffers from the same deficiencies as the approach taken by Leith and Upatnieks. U.S. Pat. No. 4,415,225 and U.S. Pat. No. 3,737,212 suffer from similar deficiencies for HUD applications.

Consequently, a need exists for a method of producing multicolor HOEs which produce bright images in the direction of the pilot and which are illuminated from a single direction by images produced by a CRT, thereby providing a compact HUD.

SUMMARY OF THE INVENTION

The present invention provides HOEs useful in presenting optically efficient multicolor images to a HUD and methods for producing such HOEs. These HOEs overcome the usual difficulty, experienced even with narrowband monochromatic HOEs, of obtaining adequate light efficiency without requiring that the record wavelengths be the same as the readout wavelengths. All readout beams come from the same direction.

The methods for producing these HOEs comprise up to three separate steps. One step allows the introduction of more than one wavelength into the reconstructed image by appropriately changing the HOE recording geometry, without changing the recording wavelength or causing the display direction of the images to be a function of the reconstructed color.

Another step constitutes the production of multicolor images by creating HOEs under the same recording geometries but with different recording wavelengths and without changing the reconstruction directions. This approach produces HOEs which allow the diffraction efficiency for various playback wavelengths to be controlled, emphasizing some colors or de-emphasizing others. One consequence of this is the production of an HOE which has the same diffraction efficiency for each wavelength. This is accomplished by simultaneously satisfying the Bragg condition for each of the wavelengths to be produced.

A third step used in the production of the HOE recognizes the fact that there are only certain recording wavelengths available from lasers while reconstruction beams are from cathode ray tube (CRT) phosphors which generate light having only certain discrete wavelengths. This third step accommodates the production of HOEs at these recognizable recording wavelengths by appropriately changing the recording geometry to allow for reproduction, at high diffraction efficiencies, of the images at these recognized predetermined wavelengths. These high efficiencies may be approximately accomplished by varying only the illumination directions of the wavefronts producing the HOEs. The direction for each record wavelength is chosen through the use of a simple computer search algorithm which optimizes the diffraction efficiency of the HOEs at each reconstruction wavelength.

The images provided by the HOE to the HUD are perceptions of the user in response to a reconstructed wavefront of electromagnetic energy. This multicolor wavefront can be analyzed either as a single wavefront containing each of the desired colors or as the summation of separate wavefronts, each containing one of the desired colors. For purposes of this application, but without limiting its scope, the former view will be held throughout.

BRIEF DESCRIPTION OF THE DRAWINGS

For a better understanding of a preferred embodiment of the present invention, together with additional objects, advantages and features thereof, reference is made to the following descriptions and accompanying drawings in which.

DETAILED DESCRIPTION OF THE PREFERRED EMBODIMENT

Figure 1:
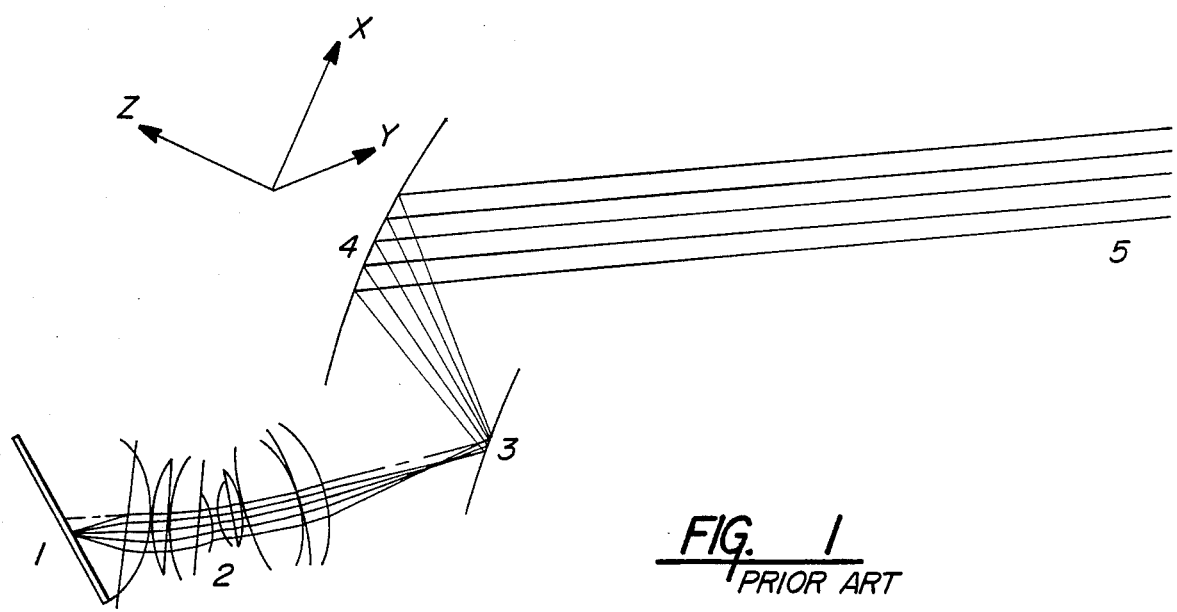
FIG. 1 shows the overall design of an existing holographic HUD operating at a single wavelength of light.

In FIG. 1, illustrating the reconstruction of an image in an existing design of a monochromatic head-up display (HUD), the light from the cathode ray tube (CRT) display at plane 1 is imaged by the relay lens 2 to an intermediate image plane, reflects off a curved mirror 3, and is diffracted by the reflection-type holographic combiner 4 to provide a collimated image to the plane 5 of the operator's eyes. The holographic combiner 4 is referred to as a holographic optical element (HOE). In this existing design. The HOE is recorded with light of one wavelength, 514.5 nm, but reconstructed using a narrow band of light emitted by a CRT phosphor centered at another wavelength, 544 nm.

Figure 2:
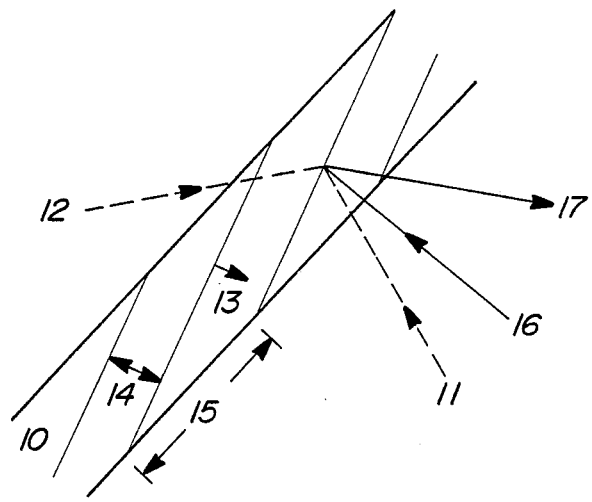
FIGS. 2, 3, 4 and 5 illustrate certain geometries of the fringe structure of a reflection-type holographic combiner and certain definitions used in explaining the operation of the holographic combiner recorded at one wavelength but used to reconstruct an image at another wavelength.

In FIG. 2 is shown the fringe structure of the reflective HOE 4. Rays 11 and 12, relevant to recording the HOE, are denoted by dashed lines. This distinguishes them from the readout ray 16 and the reconstructed ray 17, which are relevant to image reconstruction by the HOE. These latter rays are denoted by solid lines. The recording of the HOE at the recording wavelength, 514.5 nm, is accomplished by a simultaneous exposure of a photographic medium to two coherent rays of light. One is ray 11 which reaches the medium by an optical path undisturbed by scattering from complex objects. The other is ray 12 which reaches the medium after having proper phase perturbations introduced to make the resulting area of the HOE responsive to the images on the CRT. Vectors representing the directions of the reference and object rays are denoted by $n_{ref}$ and $n_{obj}$, respectively.

The interference of the wavefronts represented by the two rays 11 and 12 produce physical nonuniformities in the photographic medium. These nonuniformities correspond to the optical intensity structure of the optical field produced by the interference of the two recording wavefronts. At each point (x,y) in the HOE, the phase of one such wavefront can be expressed mathematically by the phase function $$\phi(x,y) = \sum_{i=0}^{9} \sum_{i=0}^{9} C_{ij} L_i(ax) L_j(ay)$$

where the $C_{ij}$ are arbitrary real coefficients, $L_k(.)$ is the kth Legendre polynomial, and the parameter a scales the x and y coordinates. The phase function thus recorded in the HOE can be expressed mathematically as the difference of the phase function of the object and reference wavefronts, i.e., $$\phi_H(x, y) = \phi_{obj}(x, y) - \phi_{ref}(x, y)$$

where $\phi_{obj}$ and $\phi_{ref}$ are the phase function of the object and reference wavefronts, respectively.

The fringe structure produced in the HOE, $\phi_H$, mathematically described as above, can be alternatively characterized by the grating vector 13 (K), giving the direction of the resulting fringe structure, the spacing of fringes 14 (d), and the spacing of the fringes at the surface of the HOE 15 (s).

Reconstruction of the image recorded in the HOE is accomplished by illuminating the HOE 10 with the readout ray 16, from an appropriate direction (denoted $h_{in}$) at the proper wavelength (here, 544 nm). The reconstructed ray 17 is produced by diffraction of the readout ray 16 from the fringe structure of the HOE 10. The wavelength of the reconstructed ray 17 is unchanged from that of the readout ray 16 (here, 544 nm). The mathematical relationship between the phsae functions of the readout and reconstructed wavefronts, 16 and 17 respectively is $$\phi_{out}(x, y) = \phi_{in}(x, y) + \phi_H(x, y)$$

where $\phi_{in}$ and $\phi_{out}$ are the phase functions of the readout and reconstructed wavefronts, 16 and 17, respectively, and $\phi_H$ is defined as above when the HOE is recorded.

The same resulting image as reconstructed at one wavelength λ (say, 544 nm) can be reconstructed at a second wavelength λ' (say, 640 nm) if the phase function relationship $$\phi_{H'}(x,y) = \frac{\lambda}{\lambda'} \phi_H(x,y)$$

is imposed on a second HOE. This scaling will change the spacing of the fringes, but not the direction of the grating vector. If the readout wavefront direction $n_{in}$ is not changed, the reconstructed wavefront direction $n_{out}$ will also be unchanged.

Figure 3:
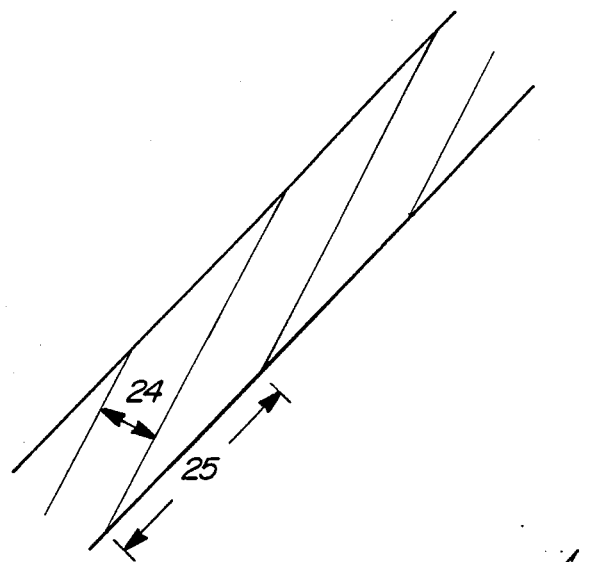

To accomplish the transformation from wavelength λ to wavelength λ', the recording conditions for the HOE must be changed to produce the desired phase function $\phi_H(x,y)$ given above. As shown in FIG. 3, which illustrates the fringe structure of a HOE recorded at the same wavelength as that shown in FIG. 2 but for reconstruction at a longer wavelength, the fringe spacing 24 (d') and surface fringe spacing 25 (s') are both changed by multiplying the original fringe spacing and surface fringe spacings by the factor $\lambda'/\lambda$.

Figure 4:
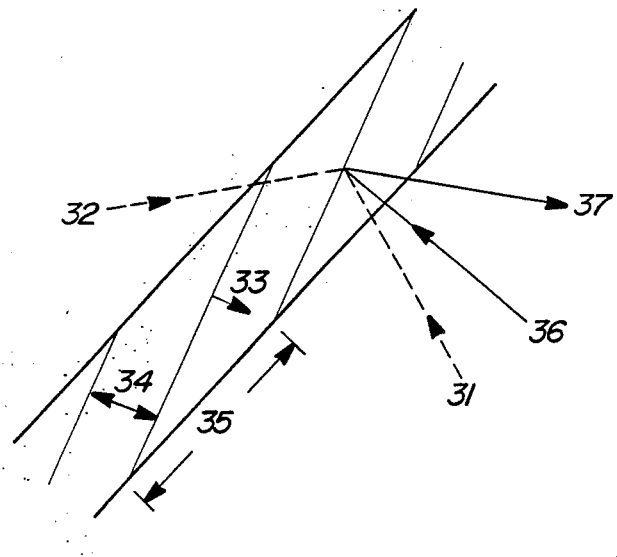

In performing the transformation to another readout wavelength, no consideration has been given to the changing diffraction efficiency which results. Another modification to the original HOE can be made to account for this factor. As shown in FIG. 4 and as mentioned above, the grating vector 33 (K) is related to the directions of the wavefronts used in the recording a reference wavefront 31 ($n_{ref}$) and an object wavefront 32 ($n_{obj}$). The relationship is $$K(x,y) = \frac{n_{obj} - n_{ref}}{\lambda_{obj}}$$

where $\lambda_{obj}$ denotes the recording wavelength (605.3 nm, in FIG. 4). The magnitude of the grating vector is $$K(x,y) = \frac{2\sin\theta}{\lambda_{obj}}.$$

where $$\theta = \tfrac{1}{2} \sin^{-1}(n_{obj} \cdot n_{ref})$$

and $\theta$ is the angle between 33 (K) and both 31 ($n_{ref}$) and 32 ($n_{obj}$).

The diffraction efficiency of the HOE illustrated in FIG. 4 is determined by the angle $\phi$ between the readout ray 36 ($n_{in}$) and the grating vector 33 (K). To maximize diffraction efficiency this angle should equal the Bragg angle, $\theta_B$, where $$\theta_B = \sin^{-1}\left(\frac{K\lambda_{in}}{2}\right) = \sin^{-1}\left(\frac{\lambda_{in}\sin\theta}{\lambda_{obj}}\right)$$

and $\lambda_{in}$ is the wavelength of the readout wavefront.

In the existing HOE design, diffraction efficiency has been approximately maximized (say, to not less than 85 percent of the maximum possible), so that $\phi$ is approximately equal to $\phi_B$, the Bragg angle.

In transforming from the original design record and reproduced wavelengths ($\lambda_{obj}$ and $\lambda_{in}$ respectively) to two new record and reproduced wavelengths ($\lambda'_{obj}$ and $\lambda'_{in}$, respectively), diffraction efficiency can be maintained by choosing the new wavelengths to satisfy $$\frac{\lambda_{in}}{\lambda_{obj}} = \frac{\lambda_{in}'}{\lambda_{obj}'}$$

Thus, for example, a design originally calling for recording wavelength of $\lambda_{obj}$=416.1 nm if $\lambda_{in}$ =440 nm, or a recording wavelength of $\lambda_{obj}$=605.3 nm if $\lambda_{in}$=640 nm.

The table below shows typical diffraction efficiencies for these wavelengths and indicates that the Bragg condition can be approximately met, even at extreme off-axis field angles.

| | | Field Angle (°) | | |
|---|---|---|---|---|
| $\lambda_{in}$(nm) | $\lambda_{obj}$(nm) | −12 | −6 | 0 |
| 440 | 416.1 | 88.9 | 92.6 | 85.3 |
| 544 | 514.5 | 86.3 | 91.4 | 83.9 |
| 640 | 605.3 | 83.0 | 88.3 | 81.1 |

A further modification to the HOE design may be necessitated by the fact that there may not be a laser source of light at the recording wavelength determined by the Bragg condition. This lack of the proper recording laser wavelength will have a very detrimental effect on the resulting diffraction efficiency. For example, where the original design calls for a recording wavelength of 514.5 nm, the green line of the argon laser, the designs for 440 and 640 nm reproduce wavelengths require recording wavelengths of 416.1 nm and 605.3 nm, respectively. The closest available laser wavelengths to these two desired wavelengths are 442 nm (from the HeCd laser) and 632.8 nm (from the HeNe laser), respectively. If the HOE design is not changed, the typical diffraction efficiencies now become 2.3 percent and 5.1 percent, respectively. To overcome this difficulty, further change in both the object and reference wavefronts must be made in order to improve the diffraction efficiency without changing the image quality, which is controlled by the direction of the reconstructed wavefront. This may be accomplished by changing the object and reference phase functions 100 obj and $\phi_{ref}$ without changing their difference, which is the HOE phase function, $\phi_H$.

As noted above, $\phi_{obj}$ and $\phi_{ref}$ are given mathematically as a series of products of the orthogonal Legendre polynomials. Therefore, $\phi_H$ will remain constant if the differences of the coefficients $C_{ij(obj)} - C_{ij(ref)}$, remain constant.

It is observed that the coefficient $C_{10(obj)}$ and $C_{10(ref)}$ affect the phase functions terms which are linear in x, and that the HOE extends primarily in the x-direction. Therefore, over the relatively small range of wavelengths involved in this HOE design, varying these terms, while keeping their difference constant, is sufficient to improve the diffraction efficiencies for 440 and 640 nm to levels which indicate that the Bragg condition is again approximately satisfied.

Diffraction efficiencies for the three wavelengths at several angles are given in the following table:

| | | Field Angle (°) | | |
|---|---|---|---|---|
| $\lambda_{in}$(nm) | $\lambda_{obj}$(nm) | −12 | −6 | 0 |
| 440 | 442 | 88.2% | 88.9% | 81.8% |
| 544 | 514.5 | 86.3 | 91.4 | 83.9 |
| 640 | 632.8 | 82.5 | 87.7 | 80.7 |

Figure 5:
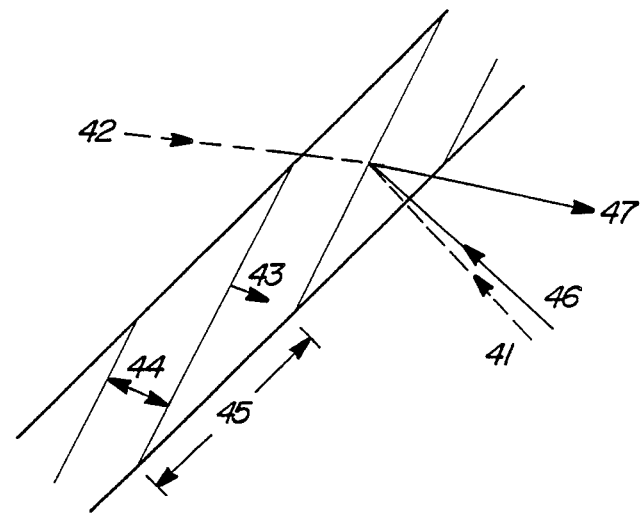

FIG. 5 illustrates the effect of altering the linear phase function terms while keeping their difference constant. Because the phase function $\phi_H$ is unchanged, the surface fringe spacing 45 (S') is constant. Because the linear terms of the phase function are altered, the reference and object rays, 41 and 42, respectively, are rotated in the opposite direction. When maximum diffraction efficiency is achieved, the angle between the reference and object rays 41 and 42, respectively, will give a fringe plane spacing 44 of approximately d', the fringe plane spacing 34 shown in FIG. 4. Further, the angle between the grating vector 43 (K) and the readout ray 46 ($n_{in}$) will be approximately the Bragg angle ($\theta_B$).

A further advantage derived from this modification, which results from the fact that the wavefront directions for the three wavelengths are the same while the difference between wavelengths is large, is that crosstalk should be minimal. Crosstalk is the diffraction of light of one wavelength by a HOE which is designed for a different wavelength. The following table shows typical diffraction efficiencies for each of the three HOEs when illuminated by light of all three wavelengths. It indicates that average crosstalk is about 0.2 percent.

| Readout | Construction Wavelength (nm) | | |
|---|---|---|---|
| Wavelength (nm) | 442 | 514.5 | 632.8 |
| 440 | 88.9% | 0.3% | 0.1% |
| 544 | 0.0 | 91.4 | 0.6 |
| 640 | 0.0 | 0.0 | 87.7 |

Finally, although the figures of this application show a collimated beam reflecting from the HOE, the beam could also be either converging or diverging, if so desired. There is no intent to limit the use of these HOEs to collimated readout beams.

It is to be understood that the concepts of the invention are equally applicable to any type of display system employing a reflective HOE. Further, the illustrative example of the HUD is not intended to limit in any way the scope of this invention. In addition, particular care is taken to note that the HOE described in this application need not be of the reflective type, nor need the wavefronts produced by the holographic optical element be collimated.

I claim:

1. A method for employing light of a second wavelength, $\lambda'$ for producing a holographic optical element from a design for a holographic optical element adapted to be produced at a first wavelength $\lambda$ by a process wherein a reference beam of coherent light at said first wavelength and an object beam of coherent light at said first wavelength are impinged upon a photographic medium from a first set of directions so as to establish a first recording geometry defining a first phase function, $\phi H^{(x,y)}$ said method including:

providing second coherent reference and object beams at said second wavelength $\lambda'$;

altering the direction at which said second reference and object means impinge upon said medium so as to establish means impinge upon said medium so as to establish a second recording geometry, said second geometry selected so as to provide a second phase function $\phi' H^{(x,y)}$ which is equal to the first phase function $\phi H^{(x,y)}$ times the ratio of said first wavelength to said second wavelength; and exposing said photographic medium to said second beams.

2. A method as in claim 1 wherein said design is for a holographic optical element adapted to operate at a reproduction wavelength $\lambda_{in}$, different from the recording wavelength $\lambda_{obj}$, said method adapted to produce a holographic optical element adapted to operate at a second reproduction wavelength $\lambda'_{in}$ different from the second recording wavelength $\lambda'_{obj}$; said method including the steps of choosing such wavelengths such that $\lambda_{in}/\lambda_{obj} = \lambda'_{in}/\lambda'_{obj}$;

whereby the diffractive efficiency of said holographic optical element is maintained.

3. The method as recited in claim 1, wherein said reference beams impinge upon the recording medium on the opposite side from which the said object beams impinge upon the recording medium, thereby producing a reflective holographic optical element.

4. The method as recited in claim 1, wherein said reference beams impinge upon the recording medium on the same side as which the said object beams impinge upon the recording medium, thereby producing a transmission holographic optical element.

* * * * *

UNITED STATES PATENT AND TRADEMARK OFFICE
CERTIFICATE OF CORRECTION

PATENT NO. : 4,930,847

DATED : June 5, 1990

INVENTOR(S) : John N. Cederquist

It is certified that error appears in the above-identified patent and that said Letters Patent is hereby corrected as shown below:

Column 4, line 38, "$h_{in}$" should be --$n_{in}$--.

Column 4, line 43, "phsae" should be --phase--.

Column 5, line 14, "recording a" should be --recording-a--.

Column 6, line 31, "phase functions 100" should be --phase functions $\emptyset$--.

Column 8, lines 11 & 12, delete "Means impinge upon said medium so as to establish"

Signed and Sealed this

Fourteenth Day of May, 1991

*Attest:*

HARRY F. MANBECK, JR.

*Attesting Officer*   *Commissioner of Patents and Trademarks*